T. VARNEY.
MOTOR CONTROL SYSTEM.
APPLICATION FILED AUG. 27, 1913.
1,175,669.
Patented Mar. 14, 1916.
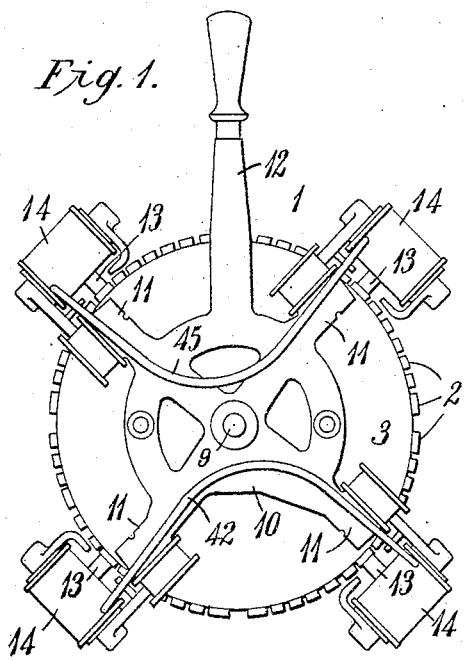
Fig. 1.
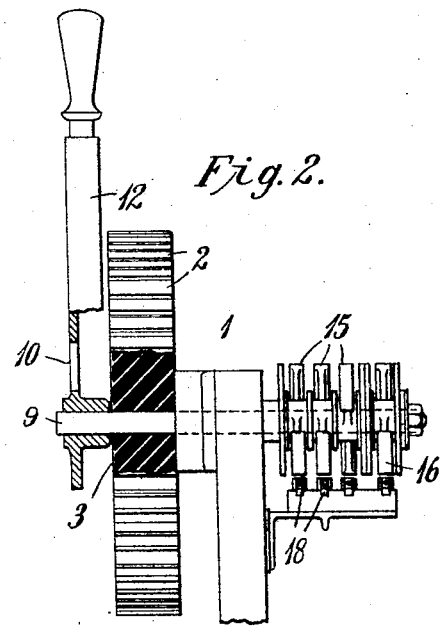
Fig. 2.
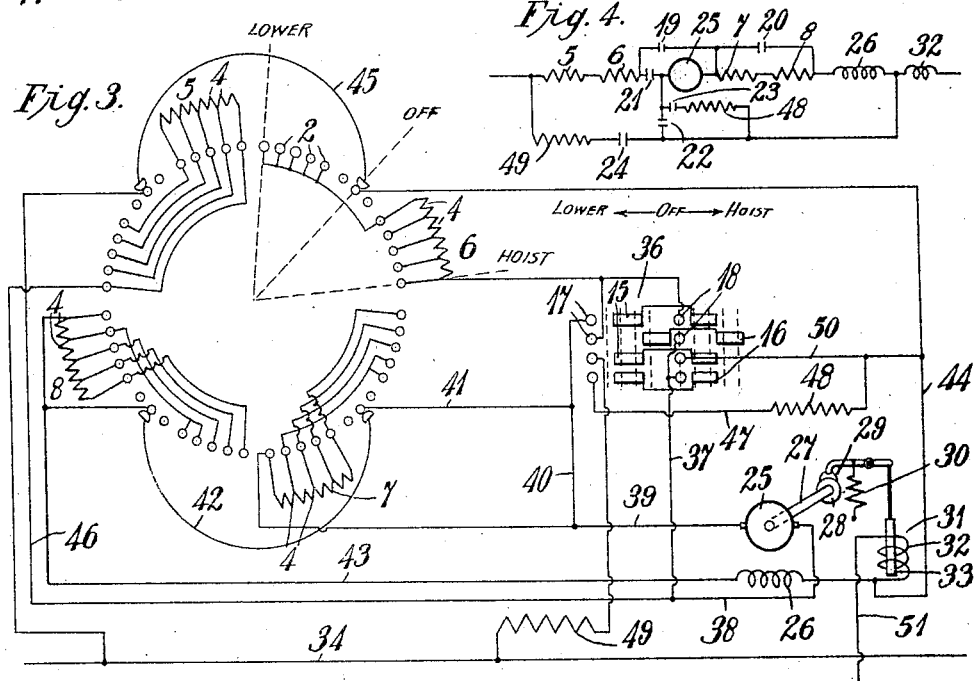
Fig. 3.
Fig. 4.
WITNESSES:
Fred H. Miller
J. R. Langley
INVENTOR
Theodor Varney
BY
Wesley G. Carr
ATTORNEY

UNITED STATES PATENT OFFICE.

THEODORE VARNEY, OF PITTSBURGH, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,175,639.

Specification of Letters Patent.

Patented Mar. 14, 1916.

Application filed August 27, 1913. Serial No. 786,820.

*To all whom it may concern:*

Be it known that I, THEODORE VARNEY, a citizen of the United States, and a resident of Pittsburgh, in the county of Allegheny and State of Pennsylvania, have invented a new and useful Improvement in Motor-Control Systems, of which the following is a specification.

My invention relates to motor control systems and it has special reference to such systems as are employed in connection with cranes, hoists and similar machinery.

My invention has for one of its objects to provide a system of the character indicated above which is so arranged as to insure a smooth and uniform operation in lowering a load and to enable the operator to control the speed at which the load is lowered.

Another object of my invention is to provide a system of motor control in which a magnet brake is automatically rendered ineffective during the operation of lowering the load, the speed being controlled by dynamic braking action of the motor.

A further object of my invention is to provide a system which is entirely automatic in its operation to stop the motor and its load in case of interruption of the current supply from any cause.

In the operation of cranes or similar machinery, it is essential that the load be lowered without shock and that the speed, although under the control of the operator, can never become dangerously high. It is also an essential feature of such devices that the motor and its load be stopped automatically when the current supply is interrupted.

A difficulty has been encountered heretofore, in systems of this character in that the actuating coil of the magnet brake, which is usually in series with the motor, is not sufficiently energized to prevent the engagement of the brake when the motor armature current is reduced to decrease the speed. The brake thus interferes with the electrical control of the motor.

My invention comprises, broadly, a motor which is adapted to operate as a series machine when hoisting and as a shunt machine when lowering a load. A single operating lever controls the power circuit of the motor in hoisting and controls the dynamic braking action of the motor in lowering the load. The magnet coil of the brake is supplied with current during the operation of lowering by a circuit which is entirely independent of the dynamic braking circuit of the motor. This arrangement insures that the brake will not operate while the motor is connected for dynamic braking, regardless of the amount of current employed to operate the motor.

The details of my invention will be described in connection with the accompanying drawings in which—

Figure 1 is an end view, in elevation, of a controller. Fig. 2 is a view in central vertical section of the controller of Fig. 1. Fig. 3 is a diagrammatic view of circuits and apparatus embodying my invention. Fig. 4 is a diagrammatic view of a simplified arrangement of the motor circuits.

Referring particularly to Figs. 1 and 2, a controller 1 comprises a ring of stationary contact segments 2, that are mounted upon and insulated by a suitable supporting body member 3. As shown in Fig. 3, the segments 2 are connected to sections 4 of resistors 5, 6, 7 and 8 which constitute what may be termed the controller resistance. The movable structure of the controller comprises a shaft 9 and a spider 10 that is mounted upon the shaft and is provided with four arms 11 and a handle 12. Each controller arm 11 carries a contact piece 13 which coacts with one quadrant of the segments 2 to control the corresponding resistor. A suitable blow out coil 14 is provided upon each controller arm.

The circuit connections of the system are controlled by a master switch 36 comprising two groups of contact segments 15 and 16 that are mounted upon the shaft 9 to coact with corresponding stationary contact fingers 17 and 18. The system comprises switches 19, 20, 21, 22, 23 and 24, shown diagrammatically in Fig. 4 and controlled by the master switch 36. Referring now to Fig. 3, a motor, the armature of which is indicated at 25 and the field winding at 26, is connected in circuit with the variable controller resistors 5, 6, 7 and 8. The motor shaft 27 is provided with a brake wheel 28 which is adapted to be engaged by a brake shoe 29. A spring 30 normally draws the brake shoe 29 toward the brake wheel 28 and a magnet 31, which comprises a coil 32 and a core member 33, holds the brake shoe 29 away from the wheel 28 when the coil 32 is energized.

When the lever 12 is shifted to the "hoist" position, the switch 21 is closed and the remaining switches are open. Current then flows from a positive line conductor 34 through resistors 5 and 6, master switch 36, conductors 37 and 38, armature 25, conductors 39, resistors 7 and 8, the field winding 26, brake magnet coil 32 and inductor 51 to a negative line conductor 5. The motor then operates as a series motor to hoist the load. The brake magn coil 32 is energized to draw the core member 33 downwardly and thereby render the brake ineffective when current is flowing in the motor circuit. The sections 4 of the several resistors 5, 6, 7 and 8 are gradually cut out as the motor speeds up.

When the lever 12 is shifted to the off position, the motor circuit is broken and the coil 32 is deënergized, thereby allowing the brake 29 to be set. The switches 20 and 22 are closed and the remaining switches are open. The maximum dynamic braking circuit of the motor, which is thereby completed, extends from the armature 25 through conductors 39, 40, 41, 42 and 43, series field winding 26, conductors 44, 45 and 46 to the motor armature. Any movement of the motor and its load is thus opposed by both a mechanical brake and the dynamic braking effect of the motor.

When the lever handle 12 is moved to the "lower" position, the switches 19, 23 and 24 are closed and the remaining switches are open. Current then flows from the line conductor 34 through the resistors 5 and 6, master switch 36, conductors 40 and 39, armature 25, conductors 38 and 37, master switch 36, conductor 47, resistor 48, conductor 44, brake coil 32 and conductor 51 to the line conductor 35. The field circuit extends from the armature 25 through conductors 39, resistors 7 and 8, conductor 43, field winding 26, conductor 44, resistor 48, conductor 47, master switch 36 and conductors 37 and 38 to the armature 25. The motor now operates in the reverse direction as a shunt motor to lower the load. The speed is controlled by the resistors 5, 6, 7 and 8, the first two of which operate to vary the armature current and the latter two operate to vary the current traversing the shunt field winding 26. The brake magnet coil 32 is supplied with current through a circuit extending from the line conductor 34, through a resistor 49, master switch 36, conductors 50 and 44, brake coil 32 and conductor 51 to the line conductor 35. The brake coil is thus supplied with current independently of the motor circuit so that the brake is not effective during the operation of lowering the load. The speed is maintained substantially uniform by the dynamic braking of the motor. The braking circuit is the same as traced above for the field circuit. When the load tends to cause the motor to rotate at a higher speed than that for which the controller handle is set, the counter electromotive force of the motor rises and thereby causes less current to pass through the armature and more current to pass through the field winding. In case the speed of the motor reaches a rate at which its counter electromotive force equals the line voltage, no current flows through the brake coil 32 from the motor armature. The brake coil is then supplied entirely by the auxiliary circuit above described.

Should the current supply fail from any cause whatever, the brake magnet coil 32 will be deënergized and the brake will be set immediately. It will be noted that the coil 32 is not included in the dynamic brake circuit of the motor. This arrangement permits the coil 32 to operate independently of the circuit conditions of the motor.

While not specifically indicated as such, the conductors 44, 39, 51, 43, and 38 constitute the trolley wires commonly employed in cranes and hoists. It will be noted, therefore, that I have provided a simple and efficient system in which only five trolley wires are necessary.

It is understood that such changes and modifications may be made in my invention as fall within the limits of the appended claims.

I claim as my invention:

1. In a control system for electric motors, an electric motor, having an armature and a field winding, a magnetic brake having a releasing coil, and a controller arranged, when in one position, to connect said field winding and said brake coil in series with the motor armature and, when in a second position, to connect said field winding in shunt relation to said armature and connect said coil in series relation to said armature.

2. In a control system for electric motors, an electric motor having an armature and a field winding, a magnetic brake having a coil, and a controller so arranged, when in one position, as to connect said field winding in shunt to said armature and to connect said coil in series with said armature and said field winding and, when in a second position, to connect said coil and said field winding in series with said armature.

3. In a control system for electric motors, an electric motor having an armature and a field winding, a magnetic brake having a coil, and a controller so arranged as to connect said field winding either in series or in parallel with said armature and to maintain the connection of said coil in series with said armature in the operative positions of said controller.

In testimony whereof, I have hereunto subscribed my name this 20th day of August 1913.

THEODORE VARNEY.

Witnesses:
ELMER C. HAMMERLE,
P. C. SWAN.